US010148464B1

(12) United States Patent
Joffe (10) Patent No.: US 10,148,464 B1
(45) Date of Patent: Dec. 4, 2018

(54) SYSTEMS AND METHODS FOR EQUALIZING A LASER DRIVE SIGNAL (71) Applicant: ADTRAN, INC., Huntsville, AL (US)

(72) Inventor: Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/269,619

(22) Filed: Sep. 19, 2016

Related U.S. Application Data (60) Provisional application No. 62/365,830, filed on Jul. 22, 2016.

(51) Int. Cl.
H04L 25/03 (2006.01)
H04B 10/564 (2013.01)
H04B 10/50 (2013.01)
H04B 10/80 (2013.01)

(52) U.S. Cl.
CPC .......... *H04L 25/03* (2013.01); *H04B 10/503* (2013.01); *H04B 10/564* (2013.01); *H04B 10/801* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0085256 A1* | 7/2002 | Auracher | ............... | H04B 10/69 398/182 |
| 2002/0141695 A1 | 10/2002 | Ghera et al. | | |
| 2005/0276614 A1* | 12/2005 | Kim | ............... | H04B 10/516 398/175 |
| 2009/0022495 A1* | 1/2009 | Welch | ............... | G02B 6/12004 398/79 |
| 2011/0268457 A1* | 11/2011 | Xu | ............... | H03F 1/083 398/155 |
| 2012/0045223 A1* | 2/2012 | Oku | ............... | H04B 10/504 398/201 |
| 2013/0016965 A1* | 1/2013 | Christensen | ....... | H04B 10/0731 398/25 |
| 2013/0188965 A1 | 7/2013 | Afriat et al. | | |

(Continued)

OTHER PUBLICATIONS

Park, et al., "High Frequency Modeling for 10Gbps DFB Laser Diode Module Packaging," Electronic Components and Technology Conference, 1996, pp. 884-887.

(Continued)

*Primary Examiner* — David Payne
*Assistant Examiner* — Omar S Ismail
(74) *Attorney, Agent, or Firm* — Maynard Cooper & Gale, P.C.; Jon E. Holland (57) ABSTRACT

A driver circuit for an optical transmitter includes a main path in parallel with an inverting path. The data signals from the main path and the inverting path can be combined to generate an output signal for a laser diode. The main path can communicate a data signal via a first transmission line and the inverting path can communicate an inverted data signal via a second transmission line. The second transmission line can be longer than the first transmission line in order to delay the inverted data signal. In addition, the inverted data signal can be weighted before being combined with the data signal from the main path.

26 Claims, 5 Drawing Sheets

(56) References Cited

U.S. PATENT DOCUMENTS

| | | | |
|---|---|---|---|
| 2015/0104190 A1* | 4/2015 | Uchino ................ | H04B 10/504 398/159 |
| 2016/0134389 A1* | 5/2016 | Murayama ........... | H04B 10/564 398/34 |
| 2017/0025816 A1* | 1/2017 | Tanaka ................. | H04B 10/504 |

OTHER PUBLICATIONS

Hanumolu, et al., "Equalizers for High-Speed Serial Links," International Journal of High Speed Electronics and Systems, vol. 15, No. 2 (2005) pp. 175-204.

* cited by examiner

SYSTEMS AND METHODS FOR EQUALIZING A LASER DRIVE SIGNAL

CROSS-REFERENCE TO RELATED APPLICATION

This application claims the benefit of U.S. Provisional Application No. 62/365,830, entitled "Method and Apparatus for Equalizing a Laser Drive Signal," and filed Jul. 22, 2016, which application is hereby incorporated by reference in its entirety.

BACKGROUND

The present application generally relates to systems and methods for equalizing a laser drive signal in an optical communication system.

There is an ongoing demand for high data rate communications. However, high data rate communications require a wide bandwidth, which can be difficult and expensive to obtain. For example, when communicating high data rates with a laser, there is an increasing loss of signal at high frequencies which limits the available bandwidth.

The main bandwidth limiting element in a laser is the parasitic inductance of the wire-bonds in the laser. One technique to address the parasitic inductance problem and increase the bandwidth is to add a series resistor near the laser to control the current to the laser. However, the addition of the resistor only provides an incremental increase in the bandwidth. Another technique that may be used to increase bandwidth is to incorporate a finite impulse response (FIR) filter into the driver circuit for the laser. The FIR filter is a type of digital signal processor (DSP) filter that has multiple digital taps and a D/A converter. The DSP implementation of an FIR filter generally is impractical to implement at high data rates.

SUMMARY

The present application generally pertains to a driver circuit for equalizing the drive waveform for a high data rate (e.g., 10 Gb) laser diode communication system. The driver circuit can be a balanced driver that provides both the signal to be transmitted and an inverted version of the signal to be transmitted. An equalized signal can be generated by adding a delayed and scaled version of the inverted signal to the original signal. The desired delay for the inverted signal can be obtained from just a small differential in the length of the transmission lines that connect the original and inverted signals to the laser diode. The relative weighting of the two paths can be implemented with resistors.

One advantage of the present application is an increase in the bandwidth over conventional techniques, such as by a factor of between approximately 2 and 4.

Another advantage of the present application is an emphasis on the transition of a signal between low and high to emphasize the high frequencies.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to a driver circuit for a laser diode in an optical communication system. The driver circuit communicates a data signal via a non-inverting data path, and the driver circuit also communicates an inverted data signal via an inverting data path. The inverted data signal can be time delayed and weighted with respect to the data signal. The data signal from the non-inverting path is combined with the delayed and weighted inverted data signal from the inverting data path in a combiner to generate an output data signal. The output data signal from the combiner can then be provided to the laser diode.

Both the non-inverting data path and the inverting data path can include transmission lines to communicate the corresponding data signals. However, the transmission line for the inverting data path can have a greater length than the transmission line for the non-inverting data path in order to obtain the desired time delay for the inverted data signal. The transmission lines for the non-inverting path and the inverting path can each have an impedance that matches the source impedance for the corresponding path to avoid reflections. The inverting path can also have a constant impedance attenuator to provide the desired weighting to the inverted data signal. The constant impedance attenuator can be configured to have an impedance that matches the source impedance for the inverting data path in order to avoid reflections. Similarly, the combiner can be configured to have an impedance at any connection point that matches the source impedance for the corresponding path connected to the combiner.

Figure 1:
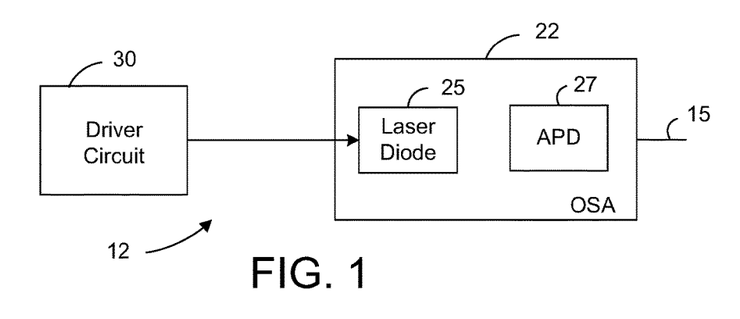
FIG. 1 is a block diagram showing an embodiment of an optical transmission system.

FIG. 1 depicts an embodiment of an optical transmission system 12. The optical transmission system 12 can be part of a fiber-optic communication system and can be coupled to an optical receiver (not shown) via an optical fiber 15. The optical transmission system 12 can transmit optical signals to the optical receiver via the fiber 15 and can receive optical signals from the fiber 15.

The optical transmission system 12 can include an optical subassembly (OSA) 22 coupled to the optical fiber 15. In one embodiment, the OSA 22 can have a laser diode 25 to transmit optical signals and an avalanche photodiode (APD) 27 to receive optical signals. However, other types of optical emitters and optical detectors are possible in other embodiments.

The laser diode 25 is coupled to a driver circuit 30 that receives an electrical data signal and drives the laser diode 25 based on the received data signal with the appropriate voltage and current for the type of laser diode 25 used. The laser diode 25 can convert the electrical signal received from the driver 30 into an optical signal for transmission through the fiber 15. Examples of optical subassemblies that can be used with the present application are described in commonly-assigned U.S. Pat. No. 9,116,076, entitled "Systems and Methods for Cancelling Electrical Crosstalk from Measurements of Optical Signals" and issued on Aug. 25, 2015, which is incorporated herein by reference.

Figure 2:
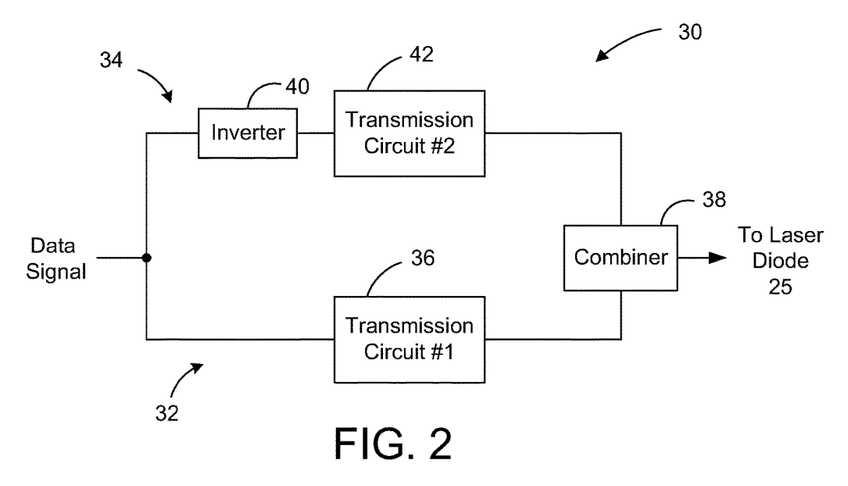
FIG. 2 is a block diagram showing an embodiment of a driver circuit for the optical transmission system of FIG. 1.
Figure 8:
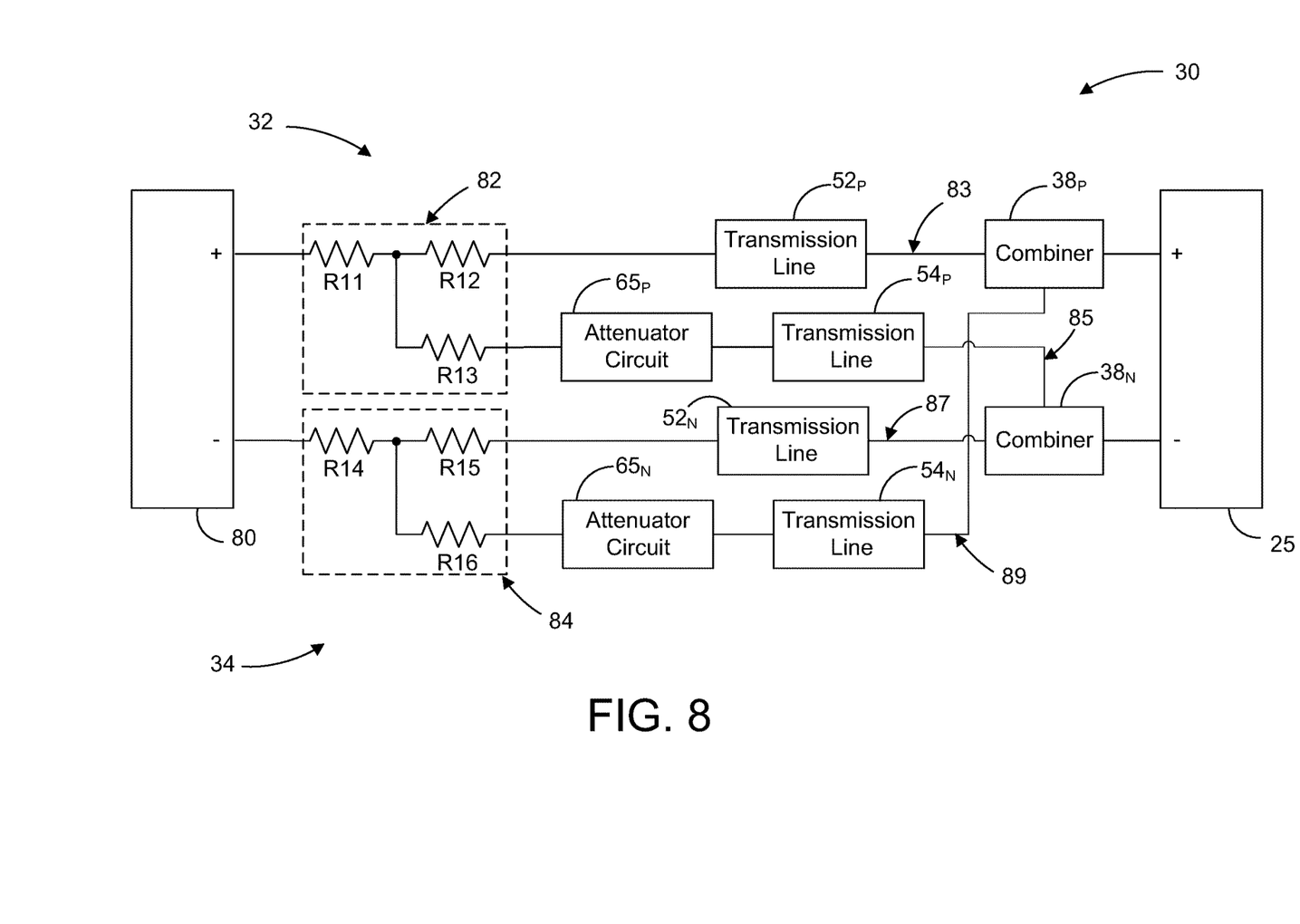
FIG. 8 shows a circuit diagram for another embodiment of a driver circuit for the optical transmission system of FIG. 1

FIG. 2 shows a block diagram of a driver circuit 30. The driver circuit 30 receives a data signal to be transmitted and provides the data signal to both a non-inverting path 32 and an inverting path 34 that has an inverter 40 to invert the data signal and can be connected in parallel to the non-inverting path 32. In other embodiments, it possible for the inverting path 34 to receive an inverted version of the data signal such that an inverter within the inverting path 34 is unnecessary. As an example, when balanced transmitters are used to drive a laser, a data signal and an inverted version of the data signal are provided to drive different terminals of the laser. FIG. 8, which will be described in more detail below describes an embodiment for which the non-inverting path 32 and the inverting path 34 are coupled to a balanced transmitter 80 (see FIG. 8) that provides a data signal and an inverted data signal for the non-inverting path 32 and the inverting path 34, respectively.

Referring to FIG. 2, the non-inverting path 32 has a first transmission circuit 36 that provides the data signal to a combiner 38. The inverting path 34 provides the inverted data signal to a second transmission circuit 42 that provides the inverted data signal to the combiner 38 after a predetermined time delay. In one embodiment, the predetermined time delay can correspond to approximately ½ of the bit time (the time it takes an individual bit to pass through the driver circuit 30) for the data signal. However, in other embodiments, the predetermined time delay can correspond to a greater or lesser portion of the bit time, e.g., between ¼ of the bit time to ¾ of the bit time. The bit time for the data signal is related to the speed with which the data signal is being transmitted. In one embodiment, the data signal can be transmitted at 10 GBit/s (gigabits per second). However, the data signal can be transmitted at greater or lesser transmission speeds in other embodiments.

The delayed inverted data signal can be provided to the combiner 38 to be combined with the data signal from the non-inverting path 32. After combining the data signal with the delayed inverted data signal, the combiner 38 provides the resultant output signal to one end of the laser diode 25 (the other end of the laser diode 25 can be coupled to a fixed potential). In one embodiment, the combiner 38 can add the data signal and the inverted data signal to generate the output signal. In another embodiment, the delayed inverted data signal may be weighted by a predetermined weighting factor such that the delayed inverted data signal has an amplitude that is greater than or less than the amplitude of the data signal. In one embodiment, the predetermined weighting factor can vary between 0 and 1 and can be selected to provide a delayed inverted data signal that has an amplitude that is less than the amplitude of the data signal. The weighting of the delayed inverted data signal may be performed in the combiner 38 and/or in the second transmission circuit 42.

Figure 3:
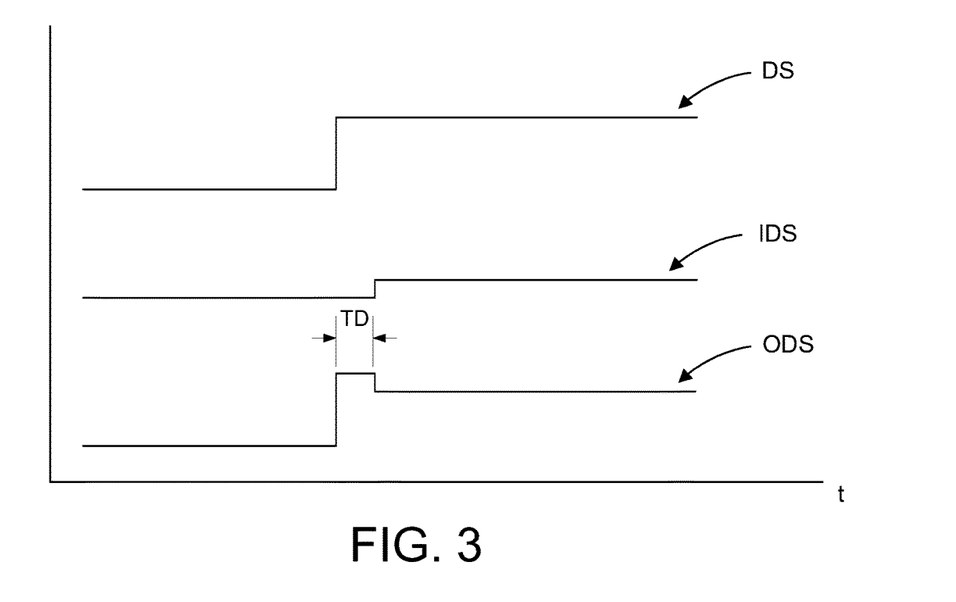
FIG. 3 shows a graph of exemplary input and output data signals for the combiner of the driver circuit.

FIG. 3 shows a graph of the input and output data signals for the combiner 38. As discussed above, the combiner 38 can receive as inputs, the data signal (DS) from the non-inverting path 32 and the delayed inverted data signal (IDS) from the inverting path 34. The combiner 38 can then provide an output data signal (ODS) to the laser diode 25. As shown in FIG. 3, the low to high transition in the IDS occurs after the low to high transition in the DS due to the time delay provided by the second transmission circuit 42. The amount of the time delay corresponds to the TD region of the ODS, i.e., the region of the ODS that has the same amplitude (when high) as the DS. In addition, the IDS can be weighted (or attenuated) such that the amplitude of the high state in the IDS is less than the amplitude of the high state in the DS. The weighting of the IDS can result in the ODS having an attenuated amplitude (when high) as shown in the region following the TD region of the ODS. By attenuating the high state of the ODS with the attenuated IDS, the driver circuit 30 emphasizes the low to high transition of the ODS in the TD region since the amplitude of the ODS in the TD region is greater than the attenuated amplitude of the ODS in the region following the TD region.

The output data signal from the driver circuit 30 can be based on a transfer function and the input data signal. In one embodiment, the transfer function can have the form shown in Equation 1.

$$Hc(s) = 1 - k \cdot e^{-s \cdot Td} \qquad (1)$$

Where:
    s is a complex frequency variable
    k is the attenuation in the inverting path 34 and k is value between 0 and 1, i.e., 0<k<1
    Td is the difference in the delay between the non-inverting path 32 and the inverting path 34.

Figure 4:
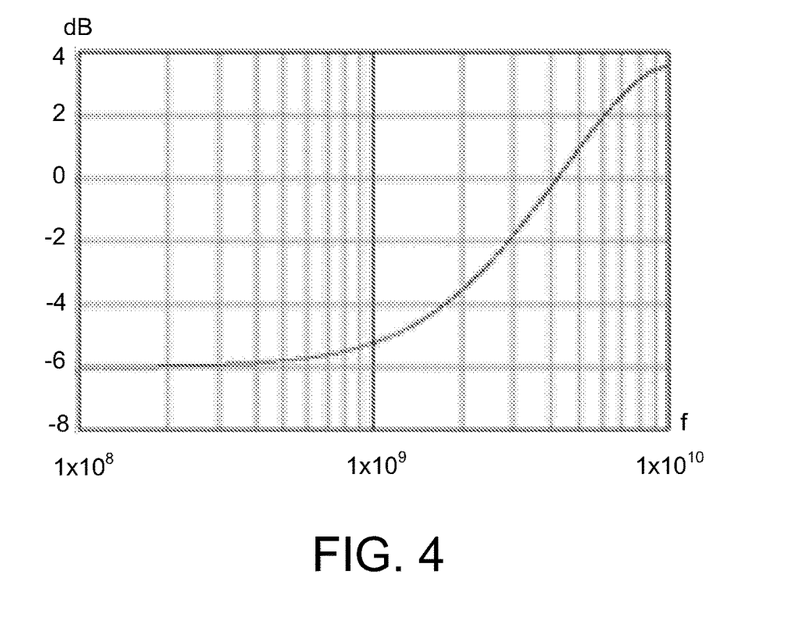
FIG. 4 shows a graph of an exemplary frequency response for an embodiment of a transfer function for the driver circuit.

The transfer function of Equation 1 can be a first order difference, i.e., an approximation to the derivative. As a result of the transfer function of Equation 1, the driver circuit 30 can emphasize the high frequencies of the input data signal. FIG. 4 shows an embodiment of the frequency response for the transfer function of Equation 1 with TD equal to ½ of the bit time at 10 Gb/s and k equal to 0.5.

Figure 5:
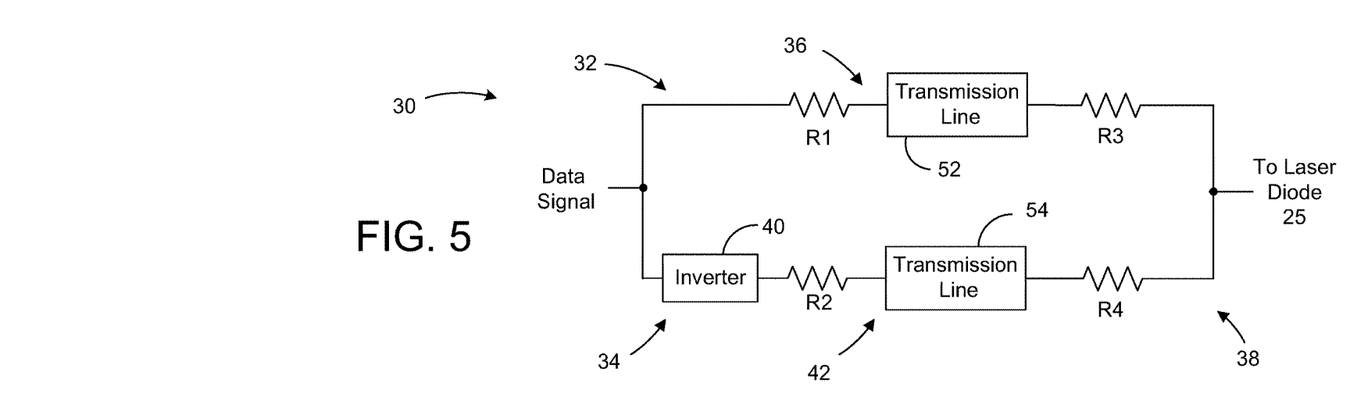
FIGS. 5 and 6 show circuit diagrams of different embodiments of the driver circuit of FIG. 2.
Figure 6:
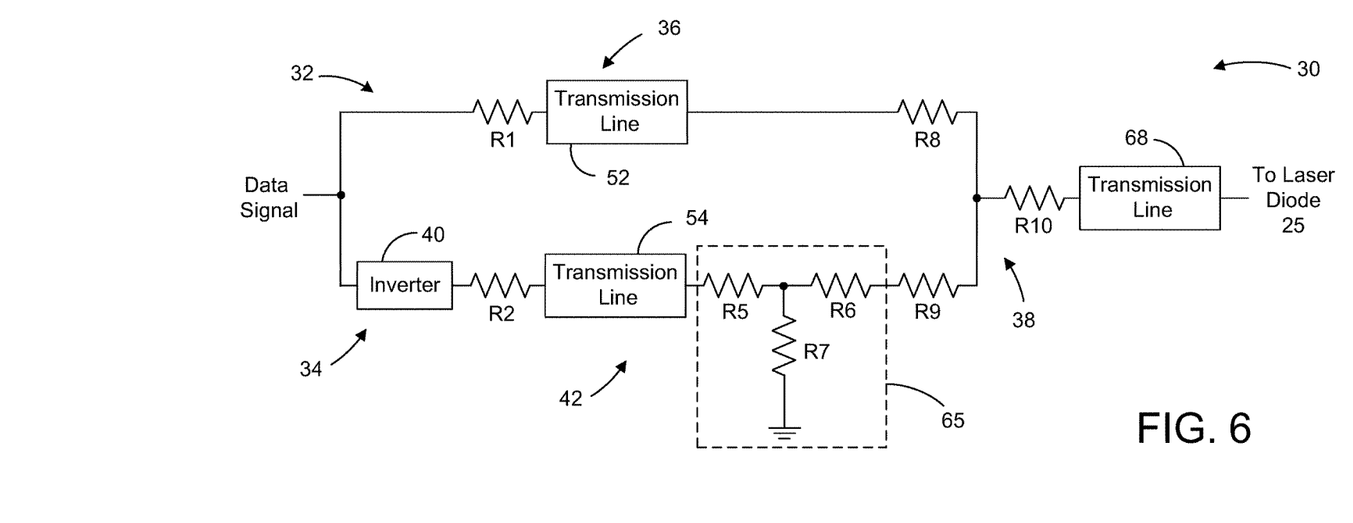

FIGS. 5 and 6 show different embodiments of the driver circuit 30. In the embodiment shown in FIG. 5, the first transmission circuit 36 can include a resistor R1 and a transmission line 52. The resistor R1 can be used to establish the source impedance for the non-inverting path 32. In order to avoid reflections and other possible problems in communicating the data signal, the transmission line 52 can have an impedance that matches the impedance associated with resistor R1. The transmission line 52 can also introduce a first predetermined time delay in the communication of the data signal based on the length of the trace on a printed circuit board (PCB) used for the transmission line 52. The output of the transmission line 52 is then provided to the combiner 38. In other embodiments, other circuit elements may be used with or without the transmission line 52 to provide the first predetermined time delay.

The second transmission circuit 42 can include a resistor R2 and a transmission line 54. The resistor R2 can be used to establish the source impedance for the inverting path 34. In order to avoid reflections and other possible problems in communicating the data signal, the transmission line 54 can have an impedance that matches the impedance associated with resistor R2. The transmission line 54 can also introduce a second predetermined time delay in the communication of the data signal based on the length of the trace used for the transmission line 54. The second predetermined time delay can be greater than the first predetermined time delay, which corresponds to the trace length on the PCB for the transmission line 54 being greater than the trace length on the PCB for the transmission line 52. The transmission line 54 can have a trace length that is greater than the trace length of the transmission line 52 such that the output of the transmission line 54 is delayed by ½ of the bit time at 10 Gb/s, e.g., 50 ps. For example, with an FR-4 PCB, a ½ bit time delay at 10 Gb/s can be achieved with a 0.3 inch difference in the length of the two transmission lines 52 and 54. The output of the transmission line 54 is then provided to the combiner 38. In other embodiments, other circuit elements may be used with or without the transmission line 54 to provide the second predetermined time delay. In addition, in the inverting path 34, the data signal is provided to inverter 40 to generate the inverted data signal for the inverting path 34.

The combiner 38 in the embodiment of FIG. 5 can be a circuit that uses a pair of summing resistors (resistor R3 and resistor R4) to combine the data signal and the delayed inverted data signal to produce the output data signal from the combiner 38. The resistor R3 can be coupled to the transmission line 52 and the resistor R4 can be coupled to the output of the transmission line 54. In addition, the resistances for resistor R3 and resistor R4 can be selected to obtain the predetermined weighting factor for the delayed inverted data signal. In one embodiment, the resistor R4 can have a resistance that is 3 times greater than the resistance of R3 to obtain the appropriate weighting of the delayed inverted data signal. However, other ratios between the resistances for resistor R4 and resistor R3 that are greater than or less than 3:1 can be used in other embodiments. In addition, resistor R3 and/or resistor R4 can be positioned in close proximity to the laser diode 25 on the PCB.

In the embodiment shown in FIG. 6, the first transmission circuit 36 can be similar to the first transmission circuit 36 shown in FIG. 5. The second transmission circuit 42 can include the resistor R2 and the transmission line 54 similar to the embodiment of the second transmission circuit 42 shown in FIG. 5. However, the second transmission circuit 42 includes a constant impedance attenuator 65 that is coupled between the second transmission line 54 and the combiner 38. The constant impedance attenuator 65 can be used to establish the predetermined weighting factor for the inverted signal on the inverting path 34. The constant impedance attenuator 65 can have an impedance that matches the impedance of the transmission line 54 and resistor R2 to avoid reflections and other communication problems on inverting path 34.

In one embodiment, the constant impedance attenuator 65 can be a circuit that includes resistor R5, resistor R6 and resistor R7. In order to match the impedance (referred to as Rc) of the transmission line 54 and resistor R2 and to obtain a particular predetermined weighting factor (referred to as PWF), the resistance values for resistors R5, R6 and R7 can be determined as follows. Resistors R5 and R6 can have a resistance value equal to Rseries as determined from Equation 2 and R7 can have a resistance value equal to Rshunt as determined from Equation 3.

$$Rseries = \frac{Rc \cdot (1 - PWF)}{1 + PWF} \quad (2)$$

$$Rshunt = \frac{2 \cdot PWF \cdot Rc}{1 - PWF^2} \quad (3)$$

In one embodiment, Rc can be 25 ohms and the PWF can be 0.61. However, other impedances and weighting factors can be used in other embodiments. As discussed above, the constant impedance attenuator 65 can be coupled to the combiner 38. However, in other embodiments, the constant impedance attenuator 65 can be coupled between resistor R2 and transmission line 54.

Figure 7:
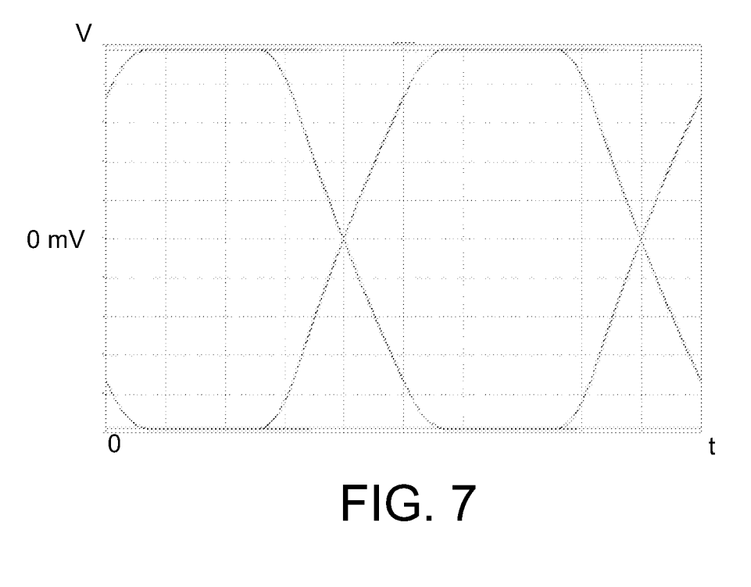
FIG. 7 shows an exemplary eye diagram from the driver circuit of FIG. 6.

The combiner 38 in the embodiment of FIG. 6 can be a circuit that uses resistor R8, resistor R9 and resistor R10 to combine the data signal (from transmission line 52) and the delayed inverted data signal (from constant impedance attenuator 65) to produce the output data signal from the combiner 38 for the laser diode 25. The resistor R8 can be coupled to the transmission line 52, resistor R9 can be coupled to constant impedance attenuator 65 and resistor R10 can be coupled to both resistors R8 and R9. The resistances for resistors R8, R9 and R10 can be equal and selected to provide a termination impedance that matches the source impedance of the non-inverting path 32 and the inverting path 34. FIG. 7 shows an eye diagram from a time domain simulation of the driver circuit 30 from FIG. 6 with the PWF equal to 0.61.

In one embodiment, the non-inverting path 32 and the inverting path 34 can be configured to have the same source impedance. However, in other embodiments, the source impedance for the non-inverting path 32 may be different from the source impedance for the inverting path 34. If the non-inverting path 32 and the inverting path 34 have different source impedances, the configuration of the combiner 38 may be altered to provide the appropriate termination impedances for the non-inverting path 32 and the inverting path 34.

Referring back to the embodiment shown in FIG. 6, a transmission line 68 can be used to couple the output of the combiner 38 with the laser diode 25. The use of the transmission line 68 to couple the combiner 38 and the laser diode 25 can provide for flexibility in arranging the components of the driver circuit 30 and/or the OSA 22 on a PCB. The transmission line 68 can have an impedance that matches the impedance of the combiner 38 to avoid reflections of the signal and can have a time delay that corresponds to the length of the transmission line 68 used in the PCB design. In another embodiment, the output of the combiner 38 can be coupled to the laser diode 25 as discussed above.

FIG. 8 shows an embodiment of a driver circuit 30 that can provide a balanced signal to laser diode 25. A balanced transmitter 80 can provide a differential signal via a non-inverting output connection (+) and an inverting output connection (−). The non-inverting output connection of the balanced transmitter 80 can provide a non-inverted signal (e.g., the data signal) to the non-inverting path 32 of the driver circuit 30 and the inverting output connection of the balanced transmitter 80 can provide an inverted signal (e.g., the inverted data signal) to the inverting path 34 of the driver circuit 30. In one embodiment, a transmission line (not shown) can be used to couple the non-inverting output connection and the non-inverting output path 32. The non-inverting path 32 can include a splitter 82 to provide the data signal to separate branches 83 and 85 of the non-inverting path 34. The splitter 82 can include resistor R11, resistor R12 and resistor R13, which can be configured to match the impedance of the transmission line (if used) coupling the non-inverting output connection and the non-inverting output path 32. The inverting path 34 can include a splitter 84 to provide the inverted data signal to separate branches 87 and 89 of the non-inverting path 34. The splitter 84 can include resistor R14, resistor R15 and resistor R16, which can be configured to match the impedance of the transmission line (if used) coupling the inverting output connection and the inverting path 34.

The non-inverting path 32 has a first branch 83 that provides the data signal to a combiner $38_P$ and a second branch 85 that provides a weighted and delayed data signal to a combiner $38_N$. The first branch 83 can include a transmission line $52_P$. The output of the transmission line $52_P$, i.e., the data signal, is then provided to the combiner $38_P$. The second branch 85 can include a constant impedance attenuator $65_P$ that is coupled between the splitter 82 and a transmission line $54_P$. The constant impedance attenuator $65_P$ can be used to establish the predetermined weighting factor for the data signal on the second branch 85. The transmission line $54_P$ can introduce a predetermined time delay in the communication of the data signal on the second branch 85 based on the length of the trace used for the transmission line $54_P$ or otherwise. The output of the transmission line $54_P$, i.e., the weighted and delayed data signal, is then provided to the combiner $38_N$. In one embodiment, the constant impedance attenuator $65_P$ can be positioned between the transmission line $54_P$ and the combiner $38_N$ instead of being positioned between the splitter 82 and the transmission line $54_P$.

The inverting path 34 has a first branch 87 that provides the inverted data signal to the combiner $38_N$ and a second branch 89 that provides a weighted and delayed inverted data signal to the combiner $38_P$. The first branch 87 can include a transmission line $52_N$. The output of the transmission line $52_N$ is then provided to the combiner $38_N$. The second branch 89 can include a constant impedance attenuator $65_N$ that is coupled between the splitter 84 and a transmission line $54_N$. The constant impedance attenuator $65_N$ can be used to establish the predetermined weighting factor for the inverted data signal on the second branch 89. The transmission line $54_N$ can introduce a predetermined time delay in the communication of the inverted data signal on the second branch 89 based on the length of the trace used for the transmission line $54_N$ or otherwise. The output of the transmission line $54_N$, i.e., the weighted and delayed inverted data signal, is then provided to the combiner $38_P$. In one embodiment, the constant impedance attenuator $65_N$ can be positioned between the transmission line $54_N$ and the combiner $38_P$ instead of being positioned between the splitter 84 and the transmission line $54_N$. In another embodiment, the constant impedance attenuator $65_N$ can provide substantially the same weighting factor to the inverted data signal that constant impedance attenuator $65_P$ provides to the data signal and transmission line $54_N$ can provide substantially the same predetermined time delay to the inverted data signal that transmission line $54_P$ provides to the data signal.

The combiner $38_P$ can combine the data signal (from the first branch 83 of the non-inverting path 32) and the weighted and delayed inverted data signal (from the second branch 89 of the inverting path 34) to produce a first output data signal for a non-inverting input (+) of the laser diode 25. The combiner $38_N$ can combine the inverted data signal (from the first branch 87 of the inverting path 34) and the weighted and delayed data signal (from the second branch 85 of the non-inverting path 32) to produce a second output data signal for an inverting input (−) of the laser diode 25. In one embodiment, the second output data signal can be an inverse of the first output data signal. In addition, the first output data signal and the second output data signal can be used to provide an equalized signal to the laser diode 25. In another embodiment, the first output data signal and the second output data signal can be provided to the non-inverting input of the laser diode 25 and the inverting input of the laser diode 25 via transmission lines similar to transmission line 68 of FIG. 6.

In one embodiment, the attenuator circuit $65_P$ and the attenuator circuit $65_N$ can be configured and operate similar to attenuator circuit 65 of FIG. 6, the transmission line $52_P$ and the transmission line $52_N$ can be configured and operate similar to the transmission line 52 of FIG. 6, and the transmission line $54_P$ and the transmission line $54_N$ can be configured and operate similar to the transmission line 54 of FIG. 6. However, in other embodiments, the attenuator circuit $65_P$ and the attenuator circuit $65_N$ can be configured and operate different from attenuator circuit 65 and from each other, the transmission line 52P and the transmission line $52_N$ can be configured and operate different from the transmission line 52 and from each other, and the transmission line $54_P$ and the transmission line $54_N$ can be configured and operate different from the transmission line 54 and from each other.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A driver circuit for an optical transmission system, comprising:
   a first data path for communicating a first data signal;
   a second data path in parallel with the first data path, the second data path having a transmission circuit for receiving and delaying an inverse of the first data signal, thereby providing a second data signal that is inverted and delayed relative to the first data signal, wherein the transmission circuit is configured to control a power of the second data signal such that the power of the second data signal is weighted by a weighting factor relative to a power of the first data signal; and
   a combiner coupled to the first data path, the second data path, and a laser diode of an optical transmission system, the combiner configured to combine the first data signal and the second data signal to provide an output signal for driving the laser diode, wherein the combiner is responsive to the first data signal for transitioning the output signal from a low state to a high state, and wherein the transmission circuit is configured to delay the second data signal relative to the first data signal such that the output signal is attenuated by the second data signal after a delay from a transition of the output signal from the low state to the high state while the output signal is in the high state.

2. The driver circuit of claim 1, wherein the transmission circuit is configured to delay the second data signal such that a delay of the second data signal relative to the first data signal is equal to about one-half of a bit time for the first data signal.

3. The driver circuit of claim 1, wherein the weighting factor is a value between 0 and 1.

4. The driver circuit of claim 1, wherein the transmission circuit comprises an attenuator for attenuating the power of the second data signal.

5. The driver circuit of claim 4, wherein the attenuator comprises a first resistor, a second resistor connected in series with the first resistor and a third resistor connected in parallel between the first resistor and the second resistor.

6. The driver circuit of claim 4, wherein the attenuator has an impedance equal to a source impedance of the second data path.

7. A driver circuit for an optical transmission system, comprising:
a first data path for communicating a first data signal;
a second data path in parallel with the first data path, the second data path having a transmission circuit for receiving and delaying an inverse of the first data signal, thereby providing a second data signal that is inverted and delayed relative to the first data signal, wherein the transmission circuit is configured to control a power of the second data signal such that the power of the second data signal is weighted by a weighting factor relative to a power of the first data signal, wherein the first data path comprises a first transmission line having a first length, the first transmission line having an impedance equal to a source impedance of the first data path, and wherein the transmission circuit comprises a second transmission line having a second length greater than the first length thereby delaying the second data signal relative to the first data signal, the second transmission line having an impedance equal to a source impedance of the second data path; and
a combiner coupled to the first data path, the second data path, and a laser diode of an optical transmission system, the combiner configured to combine the first data signal and the second data signal to provide an output signal for driving the laser diode.

8. The driver circuit of claim 7, wherein the source impedance of the first data path is equal to the source impedance of the second data path.

9. The driver circuit of claim 1, wherein the combiner comprises a first resistor connected in series with the first data path and a second resistor connected in series with the second data path.

10. The driver circuit of claim 9, wherein the first resistor has a first resistance, the second resistor has a second resistance greater than the first resistance, and wherein the weighting factor is based on the second resistance.

11. The driver circuit of claim 9, wherein the combiner further comprises a third resistor having a terminal coupled to the first resistor and the second resistor.

12. The driver circuit of claim 11, further comprising a third transmission line coupled to the third resistor for providing the output signal to the laser diode.

13. The driver circuit of claim 1, wherein the first data path is coupled to a non-inverting output connection of a balanced transmitter and the second data path is coupled to an inverting output connection of the balanced transmitter.

14. A driver circuit for an optical transmission system, comprising:
a first data path for communicating a first data signal;
a second data path in parallel with the first data path, the second data path having a first transmission circuit for receiving and delaying an inverse of the first data signal, thereby providing a second data signal that is inverted and delayed relative to the first data signal, wherein the first transmission circuit is configured to control a power of the second data signal such that the power of the second data signal is weighted by a weighting factor relative to a power of the first data signal;
a first combiner coupled to the first data path, the second data path, and a laser diode of an optical transmission system, the first combiner configured to combine the first data signal and the second data signal to provide a first output signal for driving the laser diode, wherein the first combiner is coupled to a non-inverting input of the laser diode;
a third data path in parallel with the second data path for communicating a third data signal that is inverted relative to the first data signal;
a fourth data path, the fourth data path having a second transmission circuit for receiving and delaying the first data signal, thereby providing a fourth data signal that is delayed relative to the first data signal, wherein the second transmission circuit is configured to control a power of the fourth data signal such that the power of the fourth data signal is weighted by a weighting factor relative to the power of the first data signal; and
a second combiner coupled to the third data path, the fourth data path, and an inverting input of the laser diode, the second combiner configured to combine the third data signal and the fourth data signal to provide a second output signal for driving the laser diode, the second output signal being an inverse of the first output signal.

15. A method for providing a drive signal for a laser diode, comprising:
communicating a first data signal to a combiner;
receiving an inverse of the first data signal;
delaying the received inverse of the first data signal, thereby providing a second data signal that is inverted and delayed relative to the first data signal;
communicating the second data signal to the combiner;
controlling a power of the second data signal such that the power of the second data signal at the combiner is less than a power of the first data signal at the combiner;
combining the first data signal and the second data signal with the combiner, thereby providing an output data signal, wherein the combining is performed such that the output signal transitions from a low state to a high state in response to the first data signal, and wherein the delaying and the combining are performed such that the output signal is attenuated by the second data signal after a delay from a transition of the output signal from the low state to the high state while the output signal is in the high state; and
driving a laser diode with the output data signal.

16. The method of claim 15, wherein the delaying is performed such that the second data signal is delayed relative to the first data signal by an amount equal to about one-half of a bit time for the first data signal.

17. A method for providing a drive signal for a laser diode, comprising:
communicating a first data signal to a combiner;
receiving an inverse of the first data signal;
delaying the received inverse of the first data signal, thereby providing a second data signal that is inverted and delayed relative to the first data signal;
communicating the second data signal to the combiner;
controlling a power of the second data signal such that the power of the second data signal at the combiner is less than a power of the first data signal at the combiner;
combining the first data signal and the second data signal with the combiner, thereby providing an output data signal;
driving a laser diode with the output data signal; and
communicating the first data signal via a first transmission line in parallel with a second transmission line, wherein the delaying includes communicating the second data signal via the second transmission line, and wherein the second transmission line has a length that is longer than the first transmission line.

18. The method of claim 15, wherein the driving comprises:
    driving a first terminal of the laser diode with the output data signal; and
    driving a second terminal of the laser diode with an inverse of the output data signal.

19. The method of claim 15, wherein the controlling comprises attenuating the second data signal with an attenuator.

20. The method of claim 19, wherein an impedance of the attenuator is equal to a source impedance of a data path for second data signal.

21. The method of claim 17, wherein the combining is performed such that the output signal transitions from a low state to a high state in response to the first data signal, and wherein the delaying and the combining are performed such that the output signal is attenuated by the second data signal after a delay from a transition of the output signal from the low state to the high state while the output signal is in the high state.

22. The method of claim 15, wherein the delay is less than a bit time of the output signal.

23. The driver circuit of claim 7, wherein the combiner is responsive to the first data signal for transitioning the output signal from a low state to a high state, and wherein the transmission circuit is configured to delay the second data signal relative to the first data signal such that the output signal is attenuated by the second data signal after a delay from a transition of the output signal from the low state to the high state while the output signal is in the high state.

24. The driver circuit of claim 1, wherein the delay is less than a bit time of the output signal.

25. A driver circuit for an optical transmission system, comprising:
    a first data path for communicating a first data signal;
    a second data path in parallel with the first data path, the second data path having a transmission circuit for receiving and delaying an inverse of the first data signal, thereby providing a second data signal that is inverted and delayed by a delay period relative to the first data signal, wherein the transmission circuit is configured to control a power of the second data signal such that the power of the second data signal is less than a power of the first data signal; and
    a combiner coupled to the first data path, the second data path, and a laser diode of an optical transmission system, the combiner configured to combine the first data signal and the second data signal to provide an output signal for driving the laser diode, wherein the combiner is responsive to the first data signal for transitioning the output signal from a low state to a high state, and wherein the transmission circuit is configured to delay the second data signal relative to the first data signal such that, after the delay period from a transition of the output signal from the low state to the high state, the output signal is attenuated by the second data signal while the output signal is in the high state.

26. The driver circuit of claim 25, wherein the delay is less than a bit time of the output signal.

\* \* \* \* \*